United States Patent
Goto et al.

(10) Patent No.: US 6,769,799 B2
(45) Date of Patent: Aug. 3, 2004

(54) APPARATUS, METHODS AND ARTICLES OF MANUFACTURE FOR A CO-EXTRUDED LIGHT PIPE

(75) Inventors: Kazuhiro Goto, Markham (CA); Dragos Luca, Toronto (CA)

(73) Assignee: Tyco Electronics Canada, Markham (CA)

(*) Notice: Subject to any disclaimer, the term of this patent is extended or adjusted under 35 U.S.C. 154(b) by 0 days.

(21) Appl. No.: 10/385,412

(22) Filed: Mar. 10, 2003

(65) Prior Publication Data

US 2003/0174516 A1 Sep. 18, 2003

Related U.S. Application Data

(60) Provisional application No. 60/363,944, filed on Mar. 12, 2002.

(51) Int. Cl.[7] .................................................. F21V 7/04
(52) U.S. Cl. ..................... 362/551; 362/582; 362/307
(58) Field of Search ............................. 362/551, 582, 362/307, 31, 327; 385/147, 901

(56) References Cited

U.S. PATENT DOCUMENTS

| | | | |
|---|---|---|---|
| 5,219,217 A | * | 6/1993 | Aikens ....................... 362/560 |
| 5,982,969 A | * | 11/1999 | Sugiyama et al. .......... 385/123 |
| 5,987,199 A | * | 11/1999 | Zarian et al. ................. 385/31 |
| 6,095,673 A | | 8/2000 | Goto et al. |
| 6,278,827 B1 | | 8/2001 | Sugiyama et al. |

FOREIGN PATENT DOCUMENTS

| | | |
|---|---|---|
| EP | 0874191 A | 10/1998 |
| WO | 9966355 A | 12/1999 |
| WO | 0042456 A | 7/2000 |

* cited by examiner

Primary Examiner—Thomas M. Sember
Assistant Examiner—Ali Alavi

(57) ABSTRACT

A light pipe may be used to illuminate an elongated area. Light may emanate laterally relative to the axis of the light pipe, and the light intensity is substantially uniform along the length of the light pipe. The light pipe may include a translucent member and a opaque reflective member that is separated from the translucent member by an air gap. A band of reflective material may be located on an exterior surface of the translucent member. The entire light pipe may be formed by co-extrusion of the translucent member, the band of reflective material and the opaque section through a single co-extrusion die. Light emitted laterally from the translucent member toward the arcuate opaque reflective member and band of reflective material may be reflected laterally through the translucent member transverse to the axis of the light pipe, so that all light extends through the front surface of the translucent member.

12 Claims, 3 Drawing Sheets

APPARATUS, METHODS AND ARTICLES OF MANUFACTURE FOR A CO-EXTRUDED LIGHT PIPE

CROSS-REFERENCE TO RELATED APPLICATIONS

This application claims the benefit of U.S. Provisional Application Serial No. 60/363,944 filed Mar. 12, 2002, the entire disclosure of which is incorporated by reference herein.

FIELD OF THE INVENTION

This invention is related to light guides, or pipes, used for illumination. More particularly, this invention is directed to an illuminating light pipe that is used to illuminate an elongated area along which the light pipe extends.

BACKGROUND OF THE INVENTION

Light pipes or light guides may be employed for illumination as well as for high speed signal communication. When used for illumination, light pipes may be used to transmit light from a source to a remote area to be illuminated, and may be used to illuminate an area along which the light pipe extends. If a light pipe has a smooth outer surface with few imperfections, the index of refraction between the light pipe and air will be sufficient to reflect most of the light, propagated through the light pipe or fiber, so most of the light will be transmitted between a light source at one end and the other end of the fiber optic cable or pipe. However, to illuminate the elongated area along the light pipe or fiber, light must be emitted laterally, and to uniformly illuminate this elongated strip or path, light should be emitted at comparable levels along the light pipe. One approach is to use a multi-fiber cable with fibers of different lengths arrayed to emit light from the ends of the individual fibers at points spaced along the length of the multi-fiber cable.

Optical fiber lighting apparatus may employ several techniques for scattering light propagating within the light fiber of a light pipe into lateral modes of illumination to illuminate the area surrounding the light pipe. One such approach is to employ scattering centers within the core to scatter propagating light outwards, so that light is emitted laterally in the vicinity of the scattering centers. Another approach is to roughen portions of the core layer at the interface with the clad layer of the optical fiber, to scatter light impinging on the core-clad interface. By roughing the surface, the index of refraction is altered, so that more light can be laterally emitted from the light pipe or fiber. Although the core dimensions of the fiber or pipe remain constant for these two approaches, the light pipe is not uniform along the length of the pipe. Either discrete areas along the axis or length of the fiber or pipe must be roughened, or the scattering centers must be added at discrete locations. Therefore, the pipe or fiber typically cannot be fabricated on a continuous basis, or if a continuous fiber is used, it must be subjected to secondary operations to roughen the surface.

If the surface of a cable is roughened along the entire length of the fiber, either at the core-clad interface or along the exterior of a fiber that does not include a clad layer, light will sometimes not be emitted uniformly along the length of the fiber or pipe. A large portion of lateral light emission might occur adjacent to the light source and the lateral light emission might be significantly less near the remote end of the light pipe. A light pipe that is continuously roughened in this manner is not preferred for use in providing substantially uniform illumination along an elongate surface or area, such as along a step or the edge of a structure.

Another approach that has been employed is to position reflectors along one side of a light pipe or fiber optic cable so that light emitted from one side will be reflected back onto an area on the opposite side of the light pipe, such as employing multiple reflectors with progressively varying indices of reflection located along the length of the cable. This approach relies on the variation of the index of reflection of the separate reflectors to overcome the variation in the illumination along the length of the cable. One other approach varies the geometry of the cable along its length.

It is desired to provide uniform illumination along a surface or edge of a structure to highlight the structure for safety or other reasons. For example, it is often desirable to use a light pipe to illuminate a step up surface on a motor vehicle to increase the visibility and therefore the safety of such a feature. For both practical and aesthetic reasons, the illumination should be uniform along the length of such an elongate structure, or at least the feature should be comparably illuminated along its length. Since the light pipe is intended to illuminate the feature, a slight light intensity variation that would not be noticeable to an observer or user would still be acceptable. One attempt to provide a low cost light pipe of this type was to paint one side of a light pipe that would be mounted in a slot or channel on the vehicle. The paint would provide an opaque surface on one side that would hopefully reflect light back through the light pipe onto the exterior of the structure on which this light pipe was mounted.

SUMMARY OF THE INVENTION

The present invention provides a light pipe that may have a constant cross sectional area from which light may be laterally emitted at substantially uniform levels over the length of the light pipe. This light pipe may therefore be used in a number of cost sensitive applications, such illuminating an elongate surface to provide greater safety for users.

Embodiments of the invention include a thermoplastic light transmitting strip or guide for illuminating an elongated area between a location relatively proximate to a light source and a location relatively remote from the light source. The light intensity at the relatively remote location is approximately comparable to the light intensity at the relatively proximate location. The light pipe may include a substantially translucent and relatively clear member that may have a length equal to the distance between the relatively proximate location and the relatively remote location. The light guide, or pipe, may also include a substantially opaque reflective member extending adjacent the light guide proximal to the translucent member. A space or air gap may be formed between the opaque reflective member and the translucent member. A band of reflective material may be located proximal the translucent member on an outside surface and adjacent the air gap.

Embodiments of the invention also provide methods of fabricating a light pipe by co-extruding the translucent member and the opaque reflective member while simultaneously, or near simultaneously applying the band of reflective material to the exterior surface of the translucent member during its extrusion. The reflective member may be fabricated from the same resin used to fabricate the clear light guide with fillers added to make the reflective member relatively opaque. The band of reflective material may also be the same material as used in the reflective member. The band of reflective material may also be supplied from the same extrusion feed as the reflective member.

BRIEF DESCRIPTION OF THE DRAWINGS

The invention will be more fully understood from the following detailed description taken in conjunction with the accompanying drawings in which.

DETAILED DESCRIPTION

Figure 1:
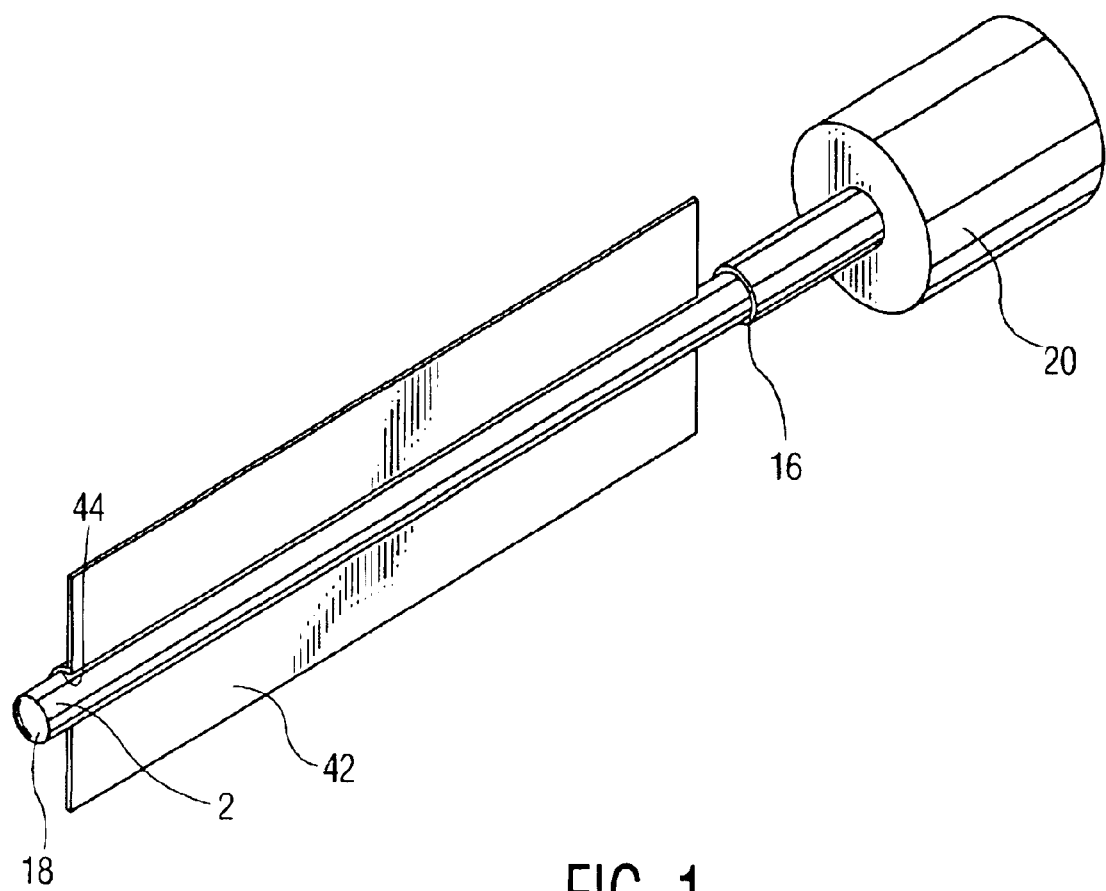
FIG. 1 is a perspective view of a lighting strip in accordance with an embodiment of the present invention including a light source located at one end of a light pipe.

One embodiment of the invention is shown in FIG. 1. The term "light pipe" as used herein is meant to include light guides or pipes, light transmitting strips, or lighting strips. Light pipe 2 as shown in FIG. 1 may illuminate an elongate area between opposite ends thereof, so that the light intensity along the length of the elongate area is approximately constant or uniform, and the light levels at each location along the light pipe 2 is comparable regardless of the distance from a light source located at one end of the light pipe 2. FIG. 1 shows the manner in which the light pipe 2 may be mounted with respect to an exemplary light source 20. In the representative embodiment shown, the light source 20 is mounted at one end of the light pipe 2. Of course in other embodiments, one or more light sources could be positioned at other locations, such as at both ends of the light pipe 2 or along its length, etc.

Figure 2:
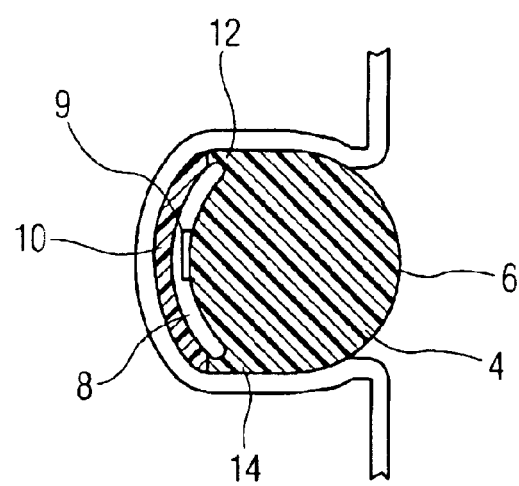
FIG. 2 is a cross sectional view of an embodiment of a light pipe showing a co-extruded clear light guide section, a band of reflective material on the exterior surface of the light guide and a relatively opaque reflecting member on the opposite side of an air gap.

In the present embodiment, light pipe 2 is an extruded member that has a constant cross section along its entire length. Alternative embodiments may have varying cross sections. Additional embodiments may have one or more sections, for example, as shown in FIG. 2, light pipe 2 has a substantially translucent light guide 4 and a substantially opaque reflective section 10, that may be separated from the light guide 4 by a space, such as air gap 8. A band of reflective material 9 may be applied to the exterior surface of the light guide 4, adjacent the air gap 8 and proximal to light guide 4. The light guide 4, the band of reflective material 9 and the opaque reflective section 10 may be co-extruded in this and other embodiments to form an axially extending member of substantially constant, but noncircular, cross section. Both the light guide 4, the band of reflective material 9 and the opaque reflective section 10 may be formed from an acrylic resin or other suitable material. The same resin may be used for the light guide 4, the band of reflective material 9 and for the opaque reflective section 10 where desired, with pigment or paint added to the acrylic resin as a filler, such as white pigment or paint, to form the opaque section 10 and the band of reflective material 9. One resin that may be used to form a light pipe in the various embodiments is an acrylic resin, but other clear resins, such as polycarbonate, polystyrene, ABS and others can be used depending upon the application. The clear resin and a resin with the opaque filler may each be fed to a co-extrusion die in a molten or fluid form and the two section light pipe with applied band of reflective material may be formed by this single die.

As shown in FIG. 2, the opaque reflective section 10 may be located on one side or at the rear of the light guide 4. The light guide 4 may be substantially circular in cross section with an exposed or front side 6, opposite the relatively opaque section 10. The front side 6 may be curved, and may be generally circular. The opaque section 10 may have an arcuate cross section and may be separated along most of its extent by air gap 8, which also may have an arcuate cross section. The width of this gap may be approximately 0.03 inch, although not limited thereto. The inner surface of the opaque section may be a concave section that will gather or reflect light emitted laterally from the rear of the light pipe 2, and direct that light laterally through the clear light guide section 4 and out the front side 6 of the light guide 4. Thus opaque section 10 may comprise a reflector to redirect light normally emitted from the rear side of light guide 4.

As shown in FIG. 2, the opaque or reflective member 10 may be joined to the light guide 4, such as at the top and bottom of the air gap 8. A top coupling section 12 and a bottom coupling section 14 may extend substantially tangentially from the top and bottom of the light guide 4, respectively, to the top and bottom of the opaque arcuate reflective section 10. The top and bottom portions of the light pipe 12 may therefore be substantially planar in certain embodiments. The inner portion of each coupling section 12 and 14 may be clear and the outer portion adjacent to the opaque reflector 10 may also be opaque where desired. The joining line between clear and opaque sections may be located in the two tangentially extending couplings 12 and 14 in certain embodiments. In the embodiment shown, the opaque material preferably does not extend into the substantially circular clear section where it would be in line with the light propagating in the light guide 4, and light propagated in the light guide 4 preferably is not obstructed by opaque sections in either coupling 12 or 14.

As also shown in FIG. 2, a band of reflective material 9 may be applied to the exterior surface of the light guide 4 in the area of the air gap where desired. This band of reflective material may be centrally located along the arcuate section of the light guide 4 in the area of the air gap 8 in certain embodiments. In this configuration, the band of reflective material preferably produces a reflected light that emerges from the central area on the front 6 of the light guide 4. Advantageously, this additional reflected light produces a uniform illumination from the light pipe 2.

One embodiment in which the light pipe 2 forms a light-transmitting strip to illuminate an elongated area is shown schematically in FIG. 1. A light source 20 may be located at one end (or both) of the light pipe 2 to form a lighting strip or lighting apparatus, and the light pipe may extend from the proximate end 16 to a remote end 18. The laterally emitted light intensity at the remote end 18 may be comparable to the light intensity at the proximate end 16 where desired, in order to provide substantially uniform illumination, at least to an observer, along the wall 42. The light pipe 2 is mounted in a channel or slot 44 of the wall 42 in the present embodiment and the light is laterally emitted only through the front section 6 of the light guide 4. In certain embodiments, the precise light intensity at the remote end 18 need not be exactly the same as the light intensity at the proximate end. Some decrease or decay may be expected in certain embodiments, but the intensity preferably should not drop off with the square of the distance from the light source 20, or at any rate that would be noticeable to an observer. The rate of lateral intensity along the length of the light pipe 2 is reduced in certain embodiments compared to that of a light pipe with a roughened surface, because the surface of light guide 4 is smooth without a large number of asperities or imperfections that would reduce the index of refraction at the air-core interface. Thus preferably most, but not all, light is reflected at this interface and continues to be propagated toward the remote end of the light guide 4. Of course there may still be some imperfections at this interface, causing light to escape laterally. Thus, only light that escapes the light guide 4 strikes the opaque reflective member 10, and is in turn redirected out the front 6 of the lighting strip. Since imperfections have not been added to the light guide 4 in this exemplary embodiment, such as by roughening the surface, a greater proportion of the light preferably reaches remote areas of the light pipe 2 resulting in a more even distribution of illumination along the lighting strip.

Figure 3:
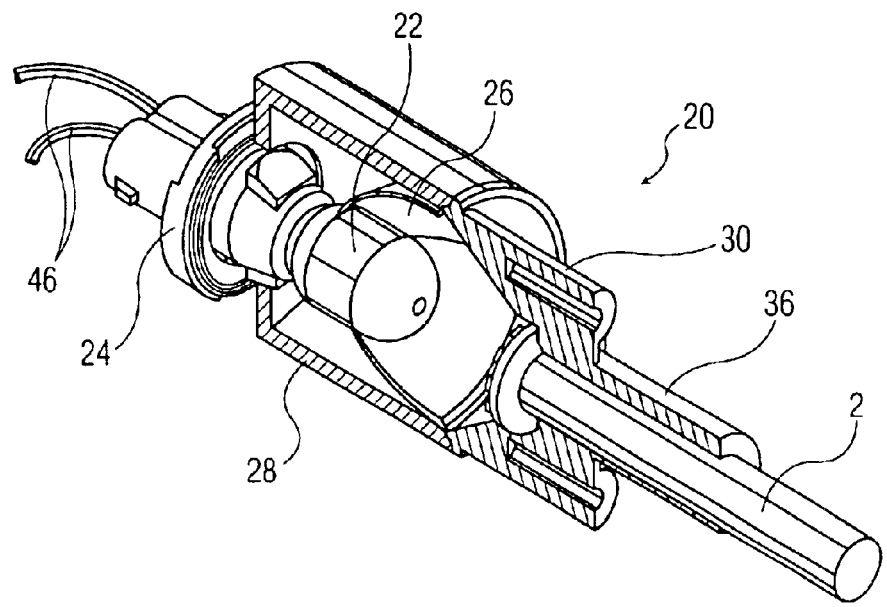
FIG. 3 is a perspective view, in section showing the lighting strip of FIG. 1.
Figure 4:
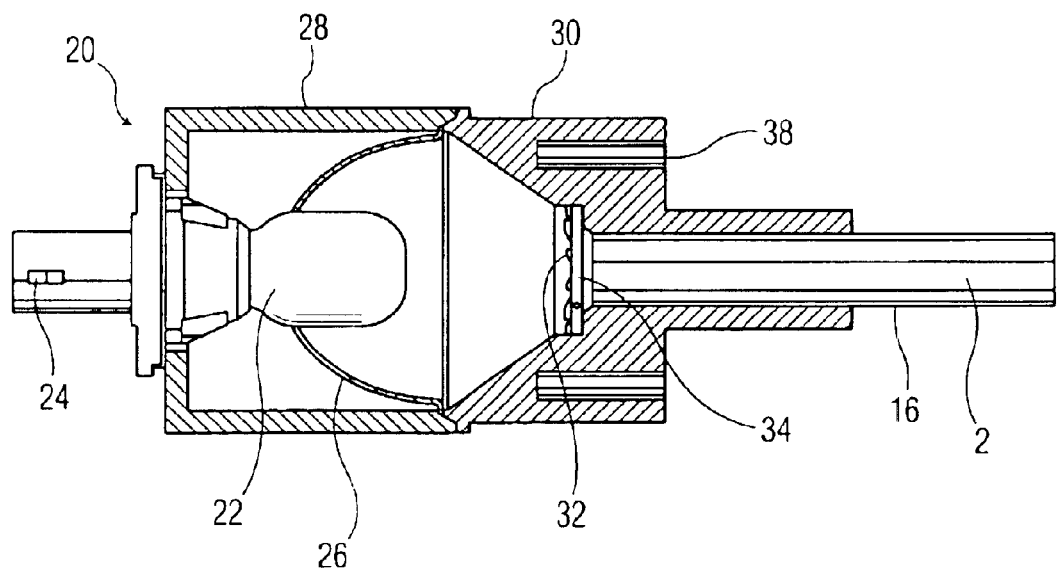
FIG. 4 is a sectional view of the lighting strip of FIG. 1.

FIGS. 3 and 4 illustrate that light pipe 2 may be connected to the exemplary light source 20 to provide the lighting strip apparatus that may be used to uniformly illuminate the surface along which the light pipe extends. As should be understood, in other embodiments, various alternative light sources may also be utilized with the light pipe 2 where desired. In the illustrated embodiment, a bulb 22 or other illumination device may be mounted in a conventional bulb socket 24. The bulb 22 may also be mounted in a reflector 26 and the light from the bulb may then be directed on the proximate light pipe end 16, which may be mounted in a die-cast aluminum light source body comprising a lamp body 28 and an end cap 30. A retaining ring 32 may be used to secure the light pipe 2 in the body and a heat shield 34 may be used to prevent exposure of the light pipe 2 to relatively high temperatures that might damage the proximate end 16 of the light pipe 2. A support collar 36 on the end cap 30 may also extend along the exterior of the light pipe 2 for a defined distance to prevent damage, and the assembly may be mounted, such as by screws inserted in mounting holes 38. The proximate end 16 may be sealed, either in the vicinity of or by the support collar 36, and the remote end 18 may also be sealed to prevent dirt or other contaminants from entering the air gap 8. Commonly available sealants, a flexible cap or any other suitable means may be used for this purpose where desired. Wires 40 may extend from the bulb socket 24 to connect the light source 20 to a source of electrical power.

The light from the bulb 20 may be focused on the light guide 4, since this is the only portion of the light pipe 2 that would transmit light along the length of the lighting strip. The opaque reflecting member 10 preferably would be at least partially offset from the focus of the lamp reflector 26, but would extend parallel to the light guide 4 along the length of the light pipe 2.

Embodiments of the invention may be used, for example, to illuminate the edge of a step on a motor vehicle, such as the step of a sport utility vehicle. Illuminating this edge of a vehicle advantageously would enhance the safety of vehicles of this type since the step, which can be quite high for children and smaller or older adults, would be clearly visible. Uniform illumination would be provided along the entire length of the step. In certain embodiments, sufficient and substantially uniform illumination may be provided along a strip having a length of at least five feet.

Figure 5:
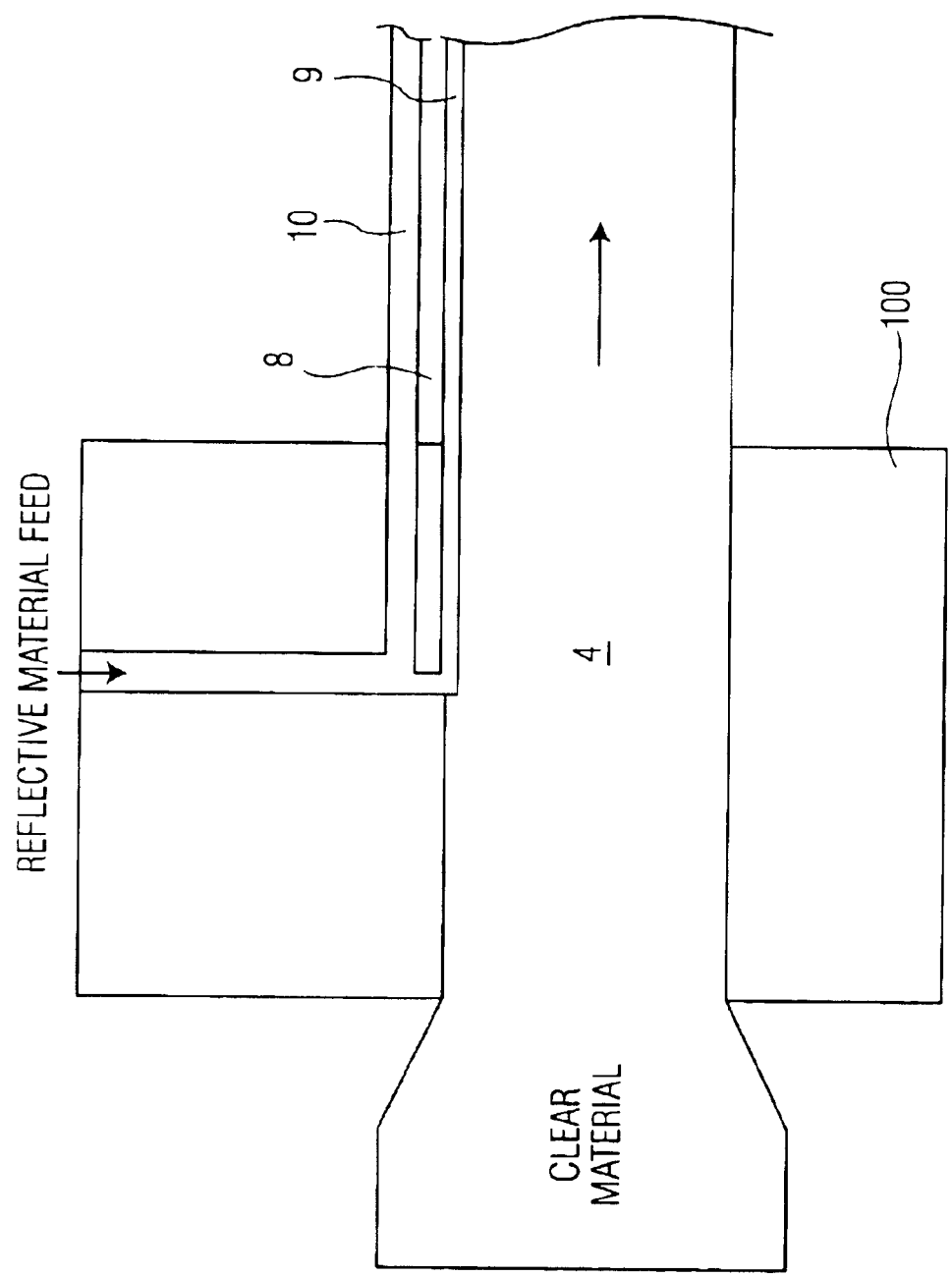
FIG. 5 is a schematic illustration of the co-extrusion process in accordance with an embodiment of the invention.

FIG. 5 provides a schematic illustration of one embodiment of a co-extrusion process of the present invention. As shown, a clear material that forms the light guide 4 may be fed into and extruded from an extrusion die 100. At substantially the same time, a feed of reflective material may be introduced into the same die 100. The feed of reflective material may be split into two feeds near the point where it meets the feed of clear material. One of the two feeds of reflective material may be extruded to form the opaque reflecting member 10 while the other of the two feeds of reflective material may be used to form the band of reflective material 9 on the exterior of the light guide 4.

While the invention has been described by illustrative embodiments, additional advantages and modifications will occur to those of ordinary skill in the art. Other modifications would be apparent to one of ordinary skill in the art. For example, the cross section of the light guide need not be circular. A flat light guide could be employed. Similarly, the reflecting member need not have a concave configuration to concentrate light in one direction. In other applications, the reflective member could be convex to disperse illumination. It would also be possible to remove selected portions of the reflective member to vary the illumination in a discontinuous manner.

Although this invention possesses certain advantages when manufacturing the light pipe by a continuous co-extrusion process, the broader aspects of this invention are not limited to light pipes that are co-extruded. For example, the light guide and the reflective member could be separately fabricated and then assembled in their final configuration. Another modification would be to employ this invention with a clad light guide. These modifications are only intended to be representative of those that would be apparent to one of ordinary skill in the art. Therefore this invention is defined by the following claims and not by the representative embodiment depicted herein.

What is claimed is:

1. A light pipe comprising:
   a substantially translucent member for transmitting light;
   a substantially opaque reflective member located proximal said substantially translucent member;
   an air gap located between said substantially opaque member and said substantially translucent member; and
   a band of substantially reflective material located in said air gap and proximal to said substantially translucent member.

2. The light pipe of claim 1, wherein said light pipe has a substantially constant cross section.

3. The light pipe of claim 1, wherein one or more of said substantially translucent member, said substantially opaque reflective member, and said band of substantially reflective material comprise an acrylic resin.

4. The light pipe of claim 1, wherein one or more of said translucent member, said substantially opaque reflective member, and said band of substantially reflective material comprise one or more materials selected from the group consisting of acrylic resins, polycarbonates, polystyrenes, and ABS.

5. The light pipe of claim 1, wherein said substantially opaque reflective member and/or said band of substantially reflective material contain a white pigment.

6. The light pipe of claim 1, wherein said translucent member is substantially circular in cross section with a curved front side located opposite said opaque reflective member, and wherein said opaque reflective member is arcuate in cross section with a concave surface facing said translucent member.

7. The light pipe of claim 6, wherein light emitted laterally from said translucent member toward said opaque reflective member and said band of reflective material is reflected laterally through said translucent member transverse to an axis thereof, so that substantially all of said light is emitted from said front surface of said translucent member.

8. The light pipe of claim 1, wherein said air gap is arcuate in cross section and has a width of approximately 0.03 inches.

9. The light pipe of claim 1, wherein said substantially translucent member is joined to said substantially opaque reflective member at a top portion and a bottom portion thereof.

10. The light pipe of claim 1, wherein said band of substantially reflective material is applied to an exterior surface of said substantially translucent member along a central portion thereof.

11. A system for providing substantially uniform illumination across an elongated area comprising:

a substantially translucent member for transmitting light;

a substantially opaque reflective member located proximal said substantially translucent member;

an air gap located between said substantially opaque member and said substantially translucent member;

a band of substantially reflective material located in said air gap and proximal to said substantially translucent member; and at least one light source for propagating light into a proximal end of said substantially translucent member for propagating to a distal end thereof, said light being substantially uniformly emitted from an elongated portion of said substantially translucent member.

12. A method of producing a light pipe comprising the steps of:

extruding a substantially translucent member;

extruding a substantially opaque reflective member located proximal said substantially translucent member; and applying a band of substantially reflective material proximal said substantially translucent member during said extension thereof, wherein said steps occur substantially simultaneously.

* * * * *